(12) United States Patent
Wang

(10) Patent No.: US 11,333,415 B2
(45) Date of Patent: May 17, 2022

(54) ELECTRONIC EXPANSION VALVE

(71) Applicant: ZHEJING SANHUA INTELLIGENT CONTROLS CO., LTD, Zhejiang (CN)

(72) Inventor: Yudong Wang, Zhejiang (CN)

(73) Assignee: ZHEJIANG SANHUA INTELLIGENT CONTROLS, Zhejiang (CN)

( * ) Notice: Subject to any disclaimer, the term of this patent is extended or adjusted under 35 U.S.C. 154(b) by 0 days.

(21) Appl. No.: 16/981,566

(22) PCT Filed: Mar. 22, 2019

(86) PCT No.: PCT/CN2019/079228
§ 371 (c)(1),
(2) Date: Sep. 16, 2020

(87) PCT Pub. No.: WO2019/179516
PCT Pub. Date: Sep. 26, 2019

(65) Prior Publication Data
US 2021/0063065 A1 Mar. 4, 2021

(30) Foreign Application Priority Data
Mar. 23, 2018 (CN) .......................... 201810243065.7

(51) Int. Cl.
F25B 41/31 (2021.01)
F16K 31/04 (2006.01)
(52) U.S. Cl.
CPC ............ F25B 41/31 (2021.01); F16K 31/047 (2013.01)
(58) Field of Classification Search
CPC ............................... F25B 41/31; F16K 31/047
See application file for complete search history.

(56) References Cited

U.S. PATENT DOCUMENTS 3,934,426 A    1/1976  Jeseperson et al.
6,460,567 B1 * 10/2002  Hansen, III ............. F16K 31/04
                                                137/554
2016/0195195 A1  7/2016  Mv et al.

FOREIGN PATENT DOCUMENTS

CN    201934686 U   8/2011
CN    203009981 U   6/2013
(Continued)

OTHER PUBLICATIONS

International Search Report dated May 31, 2019 for PCT application No. PCT/CN2019/079228.
(Continued)

Primary Examiner — Eric Keasel
(74) Attorney, Agent, or Firm — Ohlandt, Greeley, Ruggiero and Perle, LLP

(57) ABSTRACT

An electronic expansion valve is provided, including: a valve body, a rotor assembly, a support frame, a core assembly including a nut. The valve body forms a valve cavity and is provided with a valve port, and the rotor assembly includes a rotor and a screw shaft, and the screw shaft is fixedly connected to a bearing and is provided with a male thread portion, and the support frame is fixedly connected to the valve body directly or indirectly, and is provided with a mounting hole that corresponds to the bearing; and the nut has a female thread portion cooperating with the male thread portion, and the core assembly, by means of the cooperation between the male thread portion and the female thread portion, is axially moved up and down to move towards or away from the valve port.

8 Claims, 3 Drawing Sheets

(56) References Cited

FOREIGN PATENT DOCUMENTS

| | | |
|---|---|---|
| CN | 20368616 U | 7/2014 |
| CN | 203686165 U | 7/2014 |
| CN | 104132149 A | 11/2014 |
| CN | 104279342 A | 1/2015 |
| CN | 104791544 A | 7/2015 |
| CN | 2071232587 U | 3/2018 |
| JP | 2003148643 A | 5/2003 |
| JP | 2018025302 A | 2/2018 |
| KR | 20020000089 A | 1/2002 |

OTHER PUBLICATIONS

Chinese Office Action dated May 31, 2021 for Chinese Appl. No. 2018-10243065.7.
Japanese Office Action dated Nov. 16, 2021 for Japanese Appl. No. 2020-545328.

\* cited by examiner

ELECTRONIC EXPANSION VALVE

The present application is a National Phase entry of PCT Application No. PCT/CN2019/079228, filed on Mar. 22, 2019, which claims the priority to Chinese patent application No. 201810243065.7, titled "ELECTRONIC EXPANSION VALVE", filed with the China National Intellectual Property Administration on Mar. 23, 2018, both of which are incorporated herein by reference in their entireties.

FIELD

The present application relates to the technical field of refrigeration control, and in particular to an electronic expansion valve for regulating a flow rate of refrigerant.

BACKGROUND

Referring to FIG. 1, FIG. 1 shows the structure of a typical electronic expansion valve product, which includes a base 1, a valve body 2 and a housing assembly. The base 1 is fixedly connected to the valve body 2, and the base 1 is provided with a valve port 11. The housing assembly includes a first housing 31 and a second housing 32, and the first housing 31 is fixedly connected to the second housing 32. The first housing 31 is provided with a first inner cavity which accommodates a drive portion, and the second housing 32 is provided with a second inner cavity which accommodates a transmission component. The drive portion includes a rotor component 41, and a rotating shaft 42 penetrates through the center of the drive portion. The transmission component includes a gear reduction mechanism, and the gear reduction mechanism is a multi-stage gear reduction mechanism which includes a sun gear, a first-stage gear, and a second-stage gear. The second-stage gear is fixedly connected to a screw rod 43. The valve needle 7 is driven to approach or move away from the valve port 11 by the threaded cooperation between the screw rod 43 and the valve needle 7, so as to regulate the flow rate of the refrigerant flowing through the valve port 11. The working principle of the product is briefly described below. The electronic expansion valve is subjected to pulses and transmits the pulses to the drive portion, the rotor component 41 is driven to rotate, the rotating shaft 42 rotates following the rotation of the rotor component and drives the sun gear to rotate, and subjected to the transmission of the gears at all stages of the transmission component, the second-stage gear drives the screw rod 43 to rotate axially, and the valve needle 7 is axially moved to approach or move away from the valve port 11 by the threaded engagement of the screw rod 43 and the screw nut, finally regulating the flow rate. To improve the accuracy and the drive force for opening the valve, the electronic expansion valve product is designed to be provided with a gear reduction mechanism, which increases the overall size of the product. In order to limit the movement of the screw rod 43 to circumferential rotation, the screw rod 43 is fixedly connected to the second-stage gear. Moreover, a bearing component is fixedly mounted on the outer periphery of the second-stage gear, an upper portion of the bearing component is limited by a snap ring, and a lower portion is limited by a retaining ring to prevent the movement of the screw rod 43 in the up and down directions. The overall structure of the product has many assembly parts, and the assembly process is complicated, which increase the manufacturing cost.

SUMMARY

An electronic expansion valve is provided according to the present application. The overall structure of the product is relatively simple and can limit the screw rod in an axial direction.

The electronic expansion valve provided by the present application includes a valve body which has a valve cavity and a valve port; a rotor assembly, which includes a rotor and a screw rod, and the screw rod is provided with an external thread portion; a support frame, which is directly or indirectly fixedly connected to the valve body and is provided a mounting hole; a bearing, which is fixedly connected to the screw rod, and the bearing cooperates with the mounting hole; and a core assembly, which includes a screw nut, and the screw nut has an internal thread portion that cooperates with the external thread portion, and by the threaded engagement of the external thread portion and the internal thread portion, the core assembly approaches or moves away from the valve port in the valve cavity.

The electronic expansion valve provided by the present application dispenses with the gear reduction device and other complicated parts in the background technology, and through the position-limiting effect in the axial direction by the bearing and the support frame onto the screw rod, the screw rod always keeps rotating in the circumferential direction without axial displacement in the working state, which simplify the overall assembly structure of the product and help to reduce the manufacturing cost of the product.

DETAILED DESCRIPTION OF THE EMBODIMENTS

For enabling the person skilled in the art to better understand the technical solution of the present application, the present application is described in further detail hereinafter with reference to the drawings and embodiments. It should be noted that, the description for the embodiments provided in the specification is merely for preferred embodiments of the electronic expansion valve according to the present application, not for all the embodiments. If there are other relevant and reasonably developed embodiments, they should also be included in the scope of protection of the present application.

Figure 2:
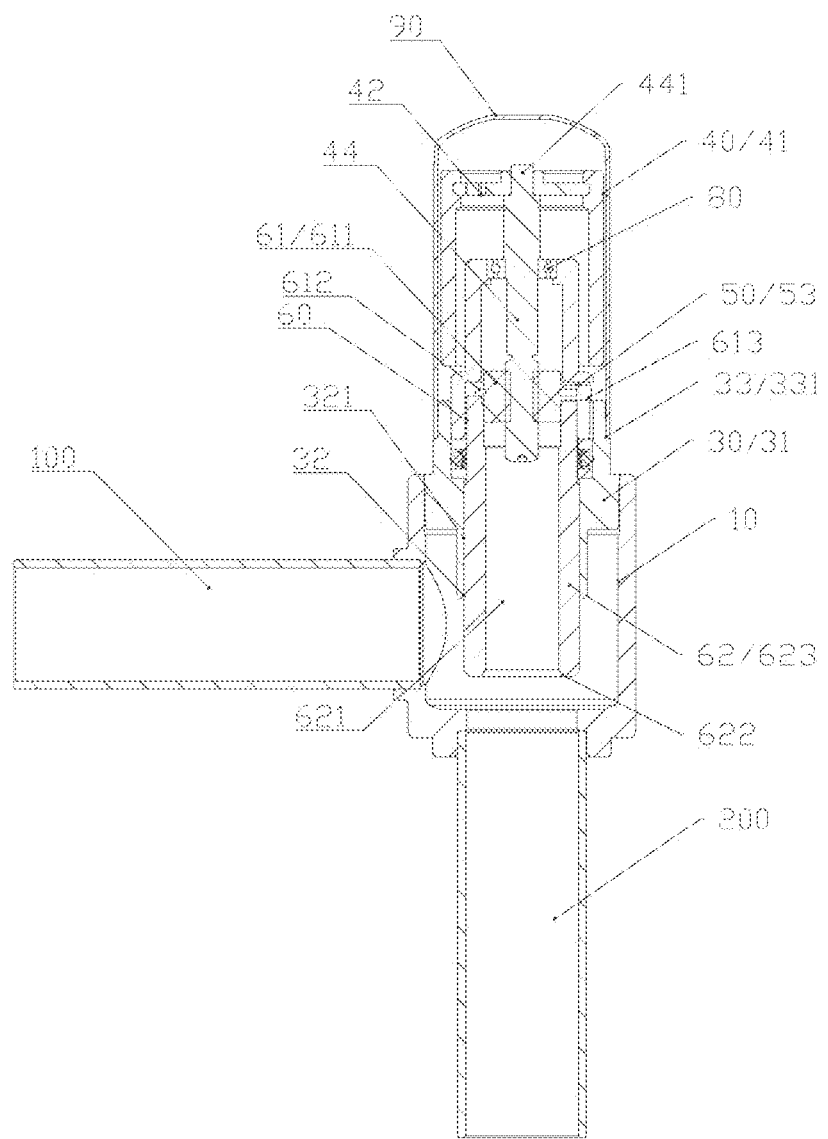
FIG. 2 is a schematic view of an electronic expansion valve according to a specific embodiment of the present application.
Figure 3:
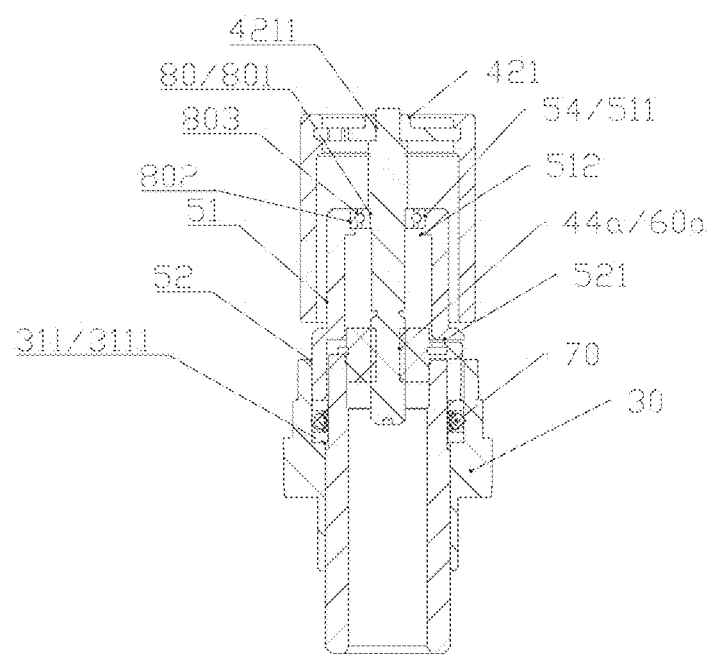
FIG. 3 is a schematic enlarged view showing the overall structure of a core assembly, a position-limiting member and a rotor assembly of the electronic expansion valve according to the present application.

Referring to FIG. 2, the electronic expansion valve includes a valve body 10. The valve body 10 has a substantially cylindrical structure and is provided with a valve cavity. The valve body 10 is further provided with a valve port 101. The valve port 101 cooperates with a core assembly 60. A first connection port is provided on a side wall of the valve body 10 by stamping or other processing methods, and a second connection port is provided at a lower end portion of the valve body. A first connecting pipe 100 is fixed to the first connection port by welding, and a second connecting pipe 200 is fixed to the second connection port by welding. The first connecting pipe 100 is in communication with the second connecting pipe 200 through the valve port 101, and the refrigerant can enter the valve cavity from the first connecting pipe 100 and flow out from the second connecting pipe 200 through the valve port 101 or the refrigerant can enter the valve cavity from the second connecting pipe 200 and flow out from the first connecting pipe 100 through the valve port 101. The electronic expansion valve has a bidirectional flow regulation function for the refrigerant.

A connecting seat 30 is fixed to an upper end portion of the valve body 10 by welding. The connecting seat 30 includes a connecting seat body 31, a guide wall 32, and a protruding portion 33. The guide wall 32 is provided with a guide hole 321. The connecting seat body 31 is fixed to the valve body 10 by welding after being press-fitted into the valve cavity, so that the entire connecting seat 30 is fixedly mounted to the valve body 10. Specifically, an outer peripheral wall of the connecting seat body 31 is fixed to an inner peripheral wall of the valve body 10 by welding. The guide wall 32 inserts into the valve cavity, and at least part of the core assembly 60 can insert into the valve cavity through the guide hole 321 and can move up and down in an axial direction along the guide hole 321. The connecting seat body 31 is provided with a first stepped portion 311, and the first stepped portion 311 has a first stepped surface 3111. The protruding portion 33 is provided with a second stepped portion 331, and a housing 90 is fixed to the second stepped portion 331 by welding. It should be noted that the connecting seat 30 may be integrated with the valve body 10.

The housing 90 and the connecting seat 30 together define a rotor cavity. The rotor cavity accommodates a rotor assembly 40. The rotor assembly 40 includes a rotor 41, a fixing seat 42 integrally molded with the rotor, and a screw rod 44. The fixing seat 42 has a guide portion 421, the guide portion 421 is provided with a lead hole 4211, and the lead hole 4211 is fixedly connected to an end portion 441 of the screw rod. A coil enclosing the outer periphery of the housing 90 drives the rotor 41 to rotate by excitation. The rotation of the rotor 41 drives the fixing seat 42 to rotate, further driving the screw rod 44 to correspondingly rotate. The screw rod 44 is further fixedly connected to a bearing 80.

The electronic expansion valve further includes a support frame 50. The support frame 50 includes an upper support frame 51 and a lower support frame 52, and is fixed to the connecting seat 30 by welding. Specifically, the entire support frame 50 is fixedly mounted to the connecting seat 30 by fixing an outer peripheral wall of the lower support frame 52 to an inner peripheral wall of the protruding portion 33 by welding. The support frame 50 is fixedly connected to the valve body 10 via the connecting seat 30. In a case that the connecting seat 30 is integrated with the valve body 10, the support frame 50 is directly fixed to the valve body 10 by welding. The support frame 50 may be directly or indirectly fixed to the valve body 10 by welding. A wall portion of the lower support frame 52 is provided with a cooperation groove 53 which cooperates with a screw nut 61 to limit a circumferential position of the core assembly 60 to prevent the core assembly 60 from rotating in the circumferential direction. The support frame 50 is further provided with a mounting hole 54. The upper support frame 51 is provided with a third stepped portion 512 protruding toward the screw rod 44. The bearing 80 includes an inner ring portion 801, an outer ring portion 802, and rollers 803 provided between the inner ring portion and the outer ring portion. The bearing 80 is entirely accommodated in the mounting hole 512 and supported by the third stepped portion 512. The overall structure of the mounting hole 54 is adapted to the bearing 80, and the bearing 80 is further provided with a bearing hole 81 which allows the screw rod 44 to pass through. The outer ring portion 802 of the bearing 80 is fixed to an inner wall 511 of the upper support frame 51 by welding, and the inner ring portion 801 of the bearing 80 is fixed to the screw rod 44 by welding. Specifically, an inner wall of the inner ring portion 801 is fixed to an outer periphery of the screw rod 44 by welding. When the electronic expansion valve is excited by the coil, the screw rod 44, the fixing seat 42 and the rotor 41 rotate as a fixedly connected integral part, the screw rod 44 and the inner ring portion 801 of the bearing 80 circumferentially rotate together, and the two together rotate with respect to the outer ring portion 802 of the bearing. The screw rod 44 cannot move up or down in the axial direction due to the cooperation with the bearing 80. While the electronic expansion valve is in operation, the screw rod 44 always keeps rotating in the circumferential direction, and the rotor 41 and the screw rod 44 are both limited by the bearing 80 and cannot move up or down in the axial direction, which can reduce the size of the overall structure of the product in the axial direction to facilitate the miniaturization of the product. Moreover, since the rotor 41 always holds a circumferential rotation position, a central axis of the rotor can keep stationary with respect to a central axis of the coil drive component mounted on the outer periphery of the housing 90, which can make full use of the magnetic force of the rotor 41 and lower the requirement for the driving force required by the product. Therefore, there is no need to increase the size of the coil component to ensure the driving force. Compared with the electronic expansion valve in the conventional technology, the electronic expansion valve according to the present application dispenses with the complicated structures such as the gear reduction device and the corrugated pipe, and the overall structure of the product is relatively simple. The screw rod 44 can be position-limited in the axial direction by the bearing 80, which reduces the manufacturing cost of the product.

The electronic expansion valve further includes the core assembly 60. The core assembly 60 includes the screw nut 61 and a valve needle 62. The screw nut 61 includes a nut body 611 which is press-fitted into a valve needle cavity 621. The screw nut 61 includes a connecting sheet 612. Both the nut body 611 and the connecting sheet 612 may be made of metal. In a case that both the nut body and the connecting sheet are made of metal, the connecting sheet 612 is fixed to the nut body 611 by welding. In a case that the nut body 611 is made of plastic and the connecting sheet is made of metal, the connecting sheet 612 is integrally injection-molded with the nut body 611. The specific material of the screw nut 61 or the connecting sheet 612 is not limited here. The screw nut 61 further includes a cooperation portion 613 which extends outward from the nut body 611. The screw nut 61 is fixed to an end surface portion of the valve needle 62 by welding via a lower end surface of the connecting sheet 612 so as to be fixedly connected to the valve needle 62 as a whole. The nut body 611 is provided with a nut mounting hole 614 which allows the screw rod 44 to pass through, and the screw nut 61 is provided with an internal thread portion 60a that is screwed to the external thread portion 44a of the screw rod 44. By the threaded engagement of the screw rod 44 and the screw nut 61, the rotation of the screw rod 44 is converted into the axial up and down movement of the core assembly 60. The cooperation portion 613 can be snapped to the cooperation groove 53, and due to the snapping action of the support frame 50, the core assembly 60 as a whole can only be moved up and down in the axial direction and cannot be rotated in the circumferential direction. The valve needle 61 has a hollow and approximately equal-diameter cylindrical structure, and includes a valve head 622 and a valve needle body 623. The valve head 622 approaches or moves away from the valve port 101 along with the axial up and down movement of the core assembly 60 to regulate the flow rate of the refrigerant flowing through the valve port 101. An outer wall of the valve needle body 623 is in clearance fit with the guide wall 32, the valve needle body 623 inserts into the valve cavity through the guide hole 321, and the valve needle body 623 can move axially along the guide wall. The guide wall 32 of the connecting seat 30 guides the valve needle 62, so that the central axis of the valve needle 62 keeps coaxial with the central axis of the valve port 101 to improve the stability and reliability of the electronic expansion valve during operation.

Figure 1:
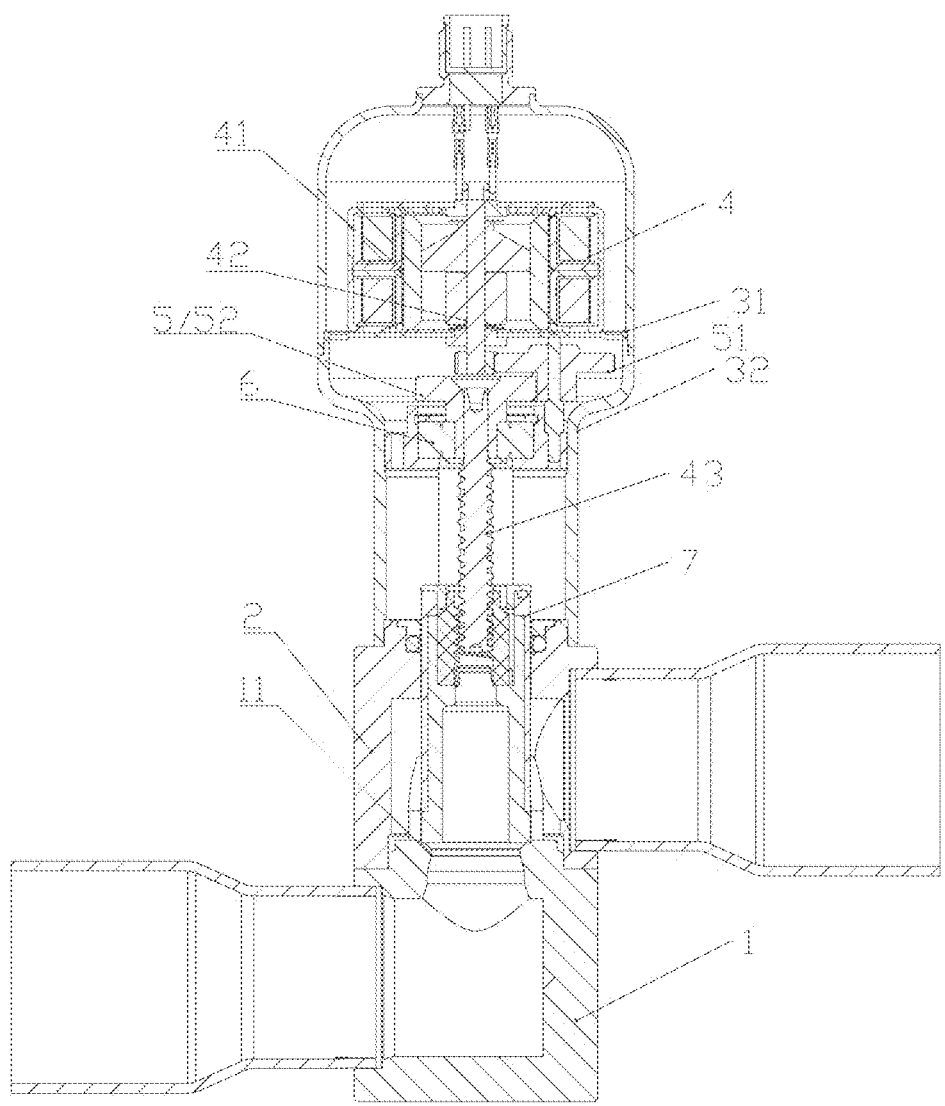
FIG. 1 is a schematic view showing the structure of a typical electronic expansion valve.

In order to balance the pressure of the valve needle cavity 621, the valve cavity and the rotor cavity during the operation of the electronic expansion valve, a sealing member 70 is further provided. When the valve is in a closed state as shown in FIG. 1, the valve head 622 abuts against the valve port 101. If the refrigerant enters the valve body 10 from the second connecting pipe 200, the core assembly 60 and the screw rod 44 are subjected to a certain pressure impact from the refrigerant. If the sealing member 70 is not provided, a relatively high pressure refrigerant directly flushes through the valve port 101, which causes the valve head 622 to be detached from the valve port 101, fails to close the valve port and has a certain impact force on the screw rod 44. Specifically, the sealing member 70 includes a gasket, an O-shaped rubber ring, and a pressing sheet. The sealing member 70 may only include the O-shaped rubber ring and the pressing sheet. The sealing member 70 is provided between the second stepped surface 3111 and the lower end portion of the lower support frame 52. The gasket or the O-shaped rubber ring abuts against the second stepped surface 3111, and the pressing sheet is press-fitted into the protruding portion 30 to fix the O-shaped rubber ring.

The operation principle of the electronic expansion valve is briefly described in the following. The rotor assembly 40 drives the rotor 41 to rotate by the excitation, the fixing seat 42 rotates along with the rotor 41, and the screw rod 44 correspondingly rotates in the circumferential direction. Due to the cooperation between the screw rod 44 and the bearing 80, the screw rod 44 and the rotor 41 only rotate in the circumferential direction, rather than move up and down in the axial direction. Due to the threaded engagement between the external thread portion 44a of the screw rod 44 and the internal thread portion 60a of the screw nut 61, the core assembly 60 moves up and down in the axial direction and the cooperation portion 613 also moves up and down along the cooperation groove 53, so that the valve head 622 approaches or moves away from the valve port 101 to regulate the flow rate of the refrigerant flowing through the valve port 101. It should be noted that, when the valve head 622 abuts against the valve port 101, the cooperation portion 613 is relatively close to the bottom of the cooperation groove 53, and when the valve head 622 is away from the valve port 101, the cooperation portion 613 is relatively close to the top of the cooperation groove 53, and when the valve head 622 reaches a farthest position from the valve port 101, the cooperation portion 613 may abut against a top wall surface 521 of the lower support frame 52. The structure of the electronic expansion valve herein dispenses with other complicated components in the background technology such as the gear reduction mechanism and the bearing. The screw rod 44 is limited from moving up and down merely through the provision of the support frame 50 and the bearing 80, which simplifies the overall assembly structure of the product. When the electronic expansion valve is in operation, the rotor 41 and the screw rod 44 always keep rotating in the circumferential direction without axial displacement, which reduces the size of the product in the axial direction and facilitates the miniaturization of the overall structure of the product to further reduce the manufacturing cost. In addition, the central axis of the rotor 41 keeps stationary with respect to the central axis of the coil drive component, which can make full use of the magnetic force of the rotor 41 to further reduce the required driving force during the operation. Due to the snapping engagement between the cooperation portion 613 and the cooperation groove 53 of the support frame 50, the core assembly 60 below the screw rod 44 cannot be rotated in the circumferential direction and can only be moved up and down in the axial direction by the screw rod 44. After being excited by the coil, the electronic expansion valve gradually converts the rotation of the screw rod 44 directly into the up and down movement of the core assembly 60 along the guide wall 32 through the threaded engagement of the external thread portion 44a and the internal thread portion 60a, so as to adjust the flow rate of the refrigerant flowing through the valve port 101. The structure of the electronic expansion valve belongs to the direct-acting drive mode. Compared with the background technology, even a small driving force can smoothly open and close the valve and maintain the regulation accuracy of the flow rate, and there is no need to use a complicated gear reduction mechanism to increase the reduction ratio to control the regulation accuracy of the flow rate and to open and close the valve.

The ordinal numbers such as "first", "second", and "third", and the orientation terms such as "up", "down", "middle", "inner", and "outer" involved in the present application are only introduced for ease of description, and should not be construed as a limitation of the sequence or spatial relationship of the components involved in the present application.

As for the electronic expansion valve provided by the present application, the screw rod and the rotor are position-limited by the cooperation portion and the support frame, the screw rod and the rotor always keep rotating in the circumferential direction without moving up and down while the electronic expansion valve is in operation, and the rotation of the screw rod is directly converted into the up and down movement of the core assembly in the axial direction through the threaded engagement. The electronic expansion valve dispenses with the gear reduction mechanism and other complicated components, and the overall structure is thereby relatively simple. The rotor and the screw rod keep rotating in the circumferential direction without axially moving, which reduces the axial size of the product. Moreover, the size of the drive coil device outside the housing can also be reduced to provide a small driving force, thereby further realizing the miniaturization of the overall structure and reducing the manufacturing cost of the product.

The above embodiments are only preferred embodiments of the present application. It should be noted that, for those skilled in the art, other improvements and modifications may be further made without departing from the principle of the present application, and these improvements and modifications should also be deemed as falling into the protection scope of the present application.

What is claimed is:
1. An electronic expansion valve, comprising:
a valve body, which has a valve cavity and is provided with a valve port;
a rotor assembly, which comprises a rotor and a screw rod, wherein the screw rod is provided with an external thread portion;

a support frame, which is directly or indirectly fixedly connected to the valve body and is provided with a mounting hole;

a bearing, which is fixedly connected to the screw rod, wherein the bearing is configured to cooperate with the mounting hole; and a core assembly, which comprises a screw nut, wherein the screw nut has an internal thread portion that cooperates with the external thread portion, and by a threaded engagement of the external thread portion and the internal thread portion, the core assembly is configured to move up and down in the valve cavity in an axial direction to approach or move away from the valve port;

wherein the support frame is provided with a cooperation groove, the screw nut has a cooperation portion, and the cooperation portion is configured to cooperate with the cooperation groove;

wherein the support frame comprises an upper support frame and a lower support frame, wherein the upper support frame is provided with a third stepped portion, wherein the lower support frame is provided with the cooperation groove, and wherein the cooperation portion is configured to abut against a top wall surface of the lower support frame.

2. The electronic expansion valve according to claim 1, comprising a connecting seat, wherein the connecting seat is fixedly connected to the valve body, and the support frame is fixedly connected to the connecting seat.

3. The electronic expansion valve according to claim 2, wherein the connecting seat is press-fitted into the valve cavity, the connecting seat comprises a connecting seat body and a protruding portion, the connecting seat body has a first stepped portion, and the protruding portion has a second stepped portion.

4. The electronic expansion valve according to claim 3, wherein the first stepped portion is provided with a first stepped surface, a sealing member is accommodated between the first stepped surface and the support frame, and the second stepped portion is fixedly connected to a housing.

5. The electronic expansion valve according to claim 4, wherein the connecting seat is further provided with a guide wall and a guide hole, the core assembly comprises a valve needle, the screw nut is fixedly connected to the valve needle, the guide hole is configured to cooperate with the valve needle, and the valve needle is configured to move up and down along the guide wall.

6. The electronic expansion valve according to claim 1, wherein the bearing is accommodated in the mounting hole and supported by the third stepped portion, the bearing is provided with a bearing hole, the bearing hole is configured to cooperate with the screw rod, and the bearing comprises an inner ring portion, an outer ring portion, and rollers between the inner ring portion and the outer ring portion.

7. The electronic expansion valve according to claim 6, wherein the inner ring portion is fixedly connected to the screw rod and the outer ring portion is fixedly connected to the support frame.

8. The electronic expansion valve according to claim 7, wherein the outer ring portion is fixedly connected to an inner wall of the upper support frame, and the screw rod and the inner ring portion are configured to together rotate with respect to the outer ring portion.

* * * * *